US006939108B2

(12) United States Patent
Boyd (10) Patent No.: US 6,939,108 B2
(45) Date of Patent: Sep. 6, 2005

(54) COOLING FAN WITH REINFORCED BLADE

(75) Inventor: Walter Boyd, Riverside, CA (US)

(73) Assignees: Mechanization Systems Company, Inc., Colton, CA (US); Delta T Corporation, Lexington, KY (US)

( * ) Notice: Subject to any disclaimer, the term of this patent is extended or adjusted under 35 U.S.C. 154(b) by 0 days.

(21) Appl. No.: 10/338,820

(22) Filed: Jan. 6, 2003

(65) Prior Publication Data

US 2004/0131470 A1 Jul. 8, 2004

(51) Int. Cl.[7] .............................................. B64C 11/16
(52) U.S. Cl. .................. 416/237; 416/210 R; 416/235; 416/236 R
(58) Field of Search ................................ 416/237, 235, 416/236 R, 210 R, 228, 23, 210; 72/253.1, 256

(56) References Cited

U.S. PATENT DOCUMENTS

| | | | |
|---|---|---|---|
| 2,135,700 A | * | 11/1938 | Cierva ......................... 416/237 |
| 2,312,095 A | * | 2/1943 | Welty ....................... 29/889.61 |
| 2,450,440 A | * | 10/1948 | Mills ....................... 416/223 R |
| 2,906,349 A | | 9/1959 | Hans et al. |
| 3,818,813 A | | 6/1974 | Freeman |
| 4,655,122 A | | 4/1987 | McCabe |
| 4,941,803 A | | 7/1990 | Wainauski et al. |
| 4,971,521 A | * | 11/1990 | Atarashi et al. ............. 416/233 |
| 5,088,665 A | | 2/1992 | Vijgen et al. |
| 5,226,783 A | | 7/1993 | Mita |
| 5,328,329 A | * | 7/1994 | Monroe .......................... 416/5 |
| 5,492,448 A | * | 2/1996 | Perry et al. ............. 416/236 R |
| 5,533,865 A | | 7/1996 | Dassen et al. |
| 5,860,788 A | | 1/1999 | Sorensen |
| 6,010,307 A | | 1/2000 | McCabe |
| 6,039,541 A | | 3/2000 | Parker et al. |
| 6,132,181 A | | 10/2000 | McCabe |
| 6,224,821 B1 | | 5/2001 | Kibble et al. |
| 6,244,821 B1 | | 6/2001 | Boyd et al. |

OTHER PUBLICATIONS

Janus, J.M., "Analysis of Industrial Fan Designs with Gurney Flaps", 38th Aerospace Sciences Meeting & Exhibit, Jan. 10–13, 2000/Reno, Nevada AIAA–2000–0983, pp. 1–9.

\* cited by examiner

*Primary Examiner*—Theresa Trieu
(74) *Attorney, Agent, or Firm*—Lathrop & Gage LC (57) ABSTRACT

A circulatory device comprising a large diameter fan having reinforced fan blades with a tapered airfoil shape is disclosed. The fan blades may be formed using an extrusion method of fabrication, wherein each fan blade may comprise a reinforced trailing edge with a downwardly extending flange. The benefit of forming each fan blade with a reinforced trailing edge of the present invention results in improved structural characteristics such that the trailing edge of each fan blade may be fabricated longer so as to improve aerodynamic performance. Also, the reinforced trailing edge resists tearing that may occur during extrusion by adding the bent flanged region to at least one distal end of the trailing edge. For example, the bent portion of the trailing edge tends to rigidly orient the extruded material in a stabilized position more readily during formation. Also, the bent portion provides added strength by providing supporting forces in two dimensions that relatively parallel and perpendicular to its length so as to neutralize the adverse effects of pressure forces acting on the trailing edge of the fan blade during extrusion.

27 Claims, 7 Drawing Sheets

COOLING FAN WITH REINFORCED BLADE

BACKGROUND OF THE INVENTION

1. Field of the Invention

The present invention relates to circulatory devices in large buildings and, in particular, concerns a cooling fan having reinforced blades that may be used to circulate a large volume of air.

2. Description of the Related Art

People who work in large buildings, such as warehouses and airport hangers, are routinely exposed to working conditions that range from being uncomfortable to hazardous. On a hot day, the inside air temperature may reach a point where a person is unable to maintain a healthy body temperature. Moreover, many activities that occur in these environments, such as welding or operating internal combustion engines, create airborne contaminants that may be deleterious to those exposed. The effects of airborne contaminants are magnified to an even greater extent if the area is not properly vented.

The problem of cooling or circulating air in large buildings may not be solved by conventional air conditioning methods. The large volume of air within the building in conjunction with the large rate of heat conducted through ceilings and walls may require powerful air conditioning devices to be effective. If such devices were used, the operating costs would be substantial. Also, conventional air conditioning routinely re-circulates the internal air for added cooling efficiency. Therefore, conventional air conditioning is not typically used in ventilation systems that serve to rapidly remove airborne contaminants, such as exhaust or smoke, and replace the contaminated air with fresh air from an outside source. For example, when welding and operating internal combustion engines within a structure, the internal air must be replaced and should not be re-circulated due to an unhealthy accumulation of airborne contaminants.

In general, small and large diameter fans may be used to provide some degree of circulation, cooling, and ventilation when conventional air conditioning is not feasible. A drawback of using small diameter fans to circulate air is that the resulting airflow dramatically tapers-off at downstream locations. Also, the large amount of electrical power required by the simultaneous use of these devices in great numbers negates their advantage as an inexpensive cooling system.

Moreover, a drawback to using large diameter fans is that they typically require specially constructed high-strength light-weight blades that may withstand large stresses caused by significant gravitational torques that increase with an increasing blade length to width aspect ratio. The fact that the rotational inertia of the fan increases with the square of the diameter requires the use of high torque producing gear reduction mechanisms. Unfortunately, conventional drivetrain components may be susceptible to mechanical failure due to the substantially large torque produced by electric motors during their startup phase, which may decrease the reliability of large diameter fans.

Certain large diameter fans have been equipped with low speed mechanisms and large fan blades with aerodynamic features. For instance, U.S. Pat. No. 6,244,821 discloses a low speed cooling fan having a large diameter with proportionally large fan blades that may be formed using a generally known extrusion process. Unfortunately, such extruded blades have unsupported trailing edges that may tear from deforming or warping during formation and cooling. As a result, the aerodynamic features are shortened due to tearing created on longer unsupported trailing edges during fabrication, which reduces the overall performance of the large fan blades. Therefore, the shortened trailing edges adversely impact the aerodynamic effectiveness of the large fan blades thereby potentially diminishing the efficiency of generated circulatory air flow within a structure.

From the foregoing, there currently exists a need for a cost efficient circulatory device that provides optimal ventilation and effective cooling in large buildings. In particular, there currently exists a need for such a circulatory device that comprises improved fan blades and a method of manufacturing the same so as to increase the structural rigidity of the blade and maintain the enhanced aerodynamic performance.

SUMMARY OF THE INVENTION

The aforementioned needs may be satisfied by a fan assembly for circulating air in an industrial building. In one embodiment, the fan assembly may comprise a support adapted to allow the mounting of the fan assembly to the roof of the industrial building and a motor coupled to the support, the motor engaged with a rotatable shaft so as to induce rotation of the shaft. The fan assembly may further comprise a plurality of fan blades attached to the rotatable shaft, wherein each fan blade is formed of an extruded metal such that a first curved wall is joined to a second curved wall to form a leading junction and a trailing junction, and wherein the trailing junction extends to form a third curved wall having a trailing edge, each blade further comprising a flange that distally extends from the trailing edge in a continuous manner such that the angular displacement of the flange from the trailing edge forms a bent region that reinforces the trailing edge. In one aspect, each fan blade comprises an airfoil shape having a tapered trailing edge that is bent to form the flange, wherein the flange downwardly extends from the lower surface of the third curved wall.

Additionally, the first curved wall may be joined to a second curved wall to form a hollow interior region. The first curved wall may be joined to a second curved wall to form a solid interior region. Also, the plurality of fan blades may be attached to a hub, which is connected to the rotatable shaft. In one embodiment, the plurality of fan blades may comprise at least ten fan blades. It should be appreciated that the plurality of fan blades may comprise two or more fan blades without departing from the scope of the present invention. Each of the plurality of fan blades may be fabricated using an extrusion technique, wherein the extruded metal comprises aluminum.

Moreover, each fan blade may comprise a cross-sectional width between approximately 5 inches and 8 inches. Each fan blade comprises a cross-sectional height between approximately 0.75 (¾) inches and 1.50 (3/2) inches. Each fan blade comprises a length between approximately 4 feet and 14 feet. The first and second curved walls comprise a thickness between approximately 0.0625 (1/16) inches and 0.1875 (3/16) inches. The third curved wall comprises a tapered shape that decreases in thickness across its length from approximately 0.125 (⅛) inches at the trailing junction to approximately 0.0625 (1/16) inches at the trailing edge. The flange comprises a length between approximately 0.25 (¼) and 0.375 (⅜) inches.

In another embodiment, the aforementioned needs may also be satisfied by a metal fan blade for a fan assembly used in an industrial building. In this particular embodiment, the fan blade may comprise an extruded cross-sectional profile having a plurality of curved walls, wherein a first curved wall is joined to a second curved wall to form an airfoil shape having a trailing edge that includes a flange extending outward from the direction of the trailing edge, wherein the flanged portion of the trailing edge downwardly extends from the lower surface of the trailing edge such that the angular displacement of the flanged portion from the lower surface of the trailing edge forms a reinforced region that increases the structural rigidity of the trailing edge so that the flanged trailing edge resists damage, and wherein the flange increases the volume of airflow resulting from the operation of the fan assembly having the fan blade.

In still another embodiment, the aforementioned may also be satisfied by a fan assembly for cooling industrial buildings. In this particular embodiment, the fan assembly may comprise a mounting assembly having a rotatable hub that attaches the fan assembly to the ceiling of the industrial building. The fan assembly may further comprise a plurality of fan blades mounted to the rotatable hub, wherein each of the plurality of fan blades is at least 3 feet long and is formed of an extruded metal so as to have a first air foil section and a tapered trailing edge, wherein a flange is integrally formed at the end of the tapered trailing edge so as to reinforce the tapered trailing edge and so as to provide increased downward thrust during rotation of the fan blades. In one aspect, the fan blades are formed using an extrusion fabrication process, wherein the flange reinforces the tapered trailing edge during the extrusion fabrication process so that the tapered trailing edge resists tearing while being formed.

In yet another embodiment, the aforementioned needs may be satisfied by a method of forming a fan blade. In this particular embodiment, the method may comprise softening a metal and forcing the metal into an extrusion mold such that a cooled metal fan blade is extruded out of the extrusion mold so as to have in cross-section a first air foil section and a tapered trailing edge integrally attached to an end of the first air foil section and a reinforcing flange that extends outward from the direction of the tapered trailing edge so as to reinforce the tapered trailing edge during extrusion to inhibit tearing of the tapered trailing edge. In one aspect, softening the metal may comprise softening aluminum, wherein softening the metal may further comprise softening an alloyed aluminum with at least one of copper, manganese, silicon, magnesium, and zinc.

Additionally, the method may still further comprise forming an extrusion die to produce the fan blade with a hollow interior, wherein forcing the metal into the extrusion die comprises applying pressure to the softened metal using an extrusion press so as to force the softened metal through the extrusion die. Also, the joined fan blades may be separated to form a plurality of individual fan blades.

In another aspect, forcing the metal into the extrusion mold may produce at least one fan blade with a uniform cross-section. Moreover, forcing the metal into the extrusion mold may produce the at least one fan blade having a first surface and a second surface that combine to form the airfoil section, which enhances the columnar properties of the airflow produced by the at least one fan blade. Furthermore, forcing the metal into the extrusion mold may produce the at least one fan blade with an extended first surface that comprises at least one of the tapered trailing edge and the reinforcing flange, which results in an improved airfoil design. These and other objects and advantages of the present invention will become more apparent from the following description taken in conjunction with the accompanying drawings.

DETAILED DESCRIPTION OF THE PREFERRED EMBODIMENT

Figure 1:
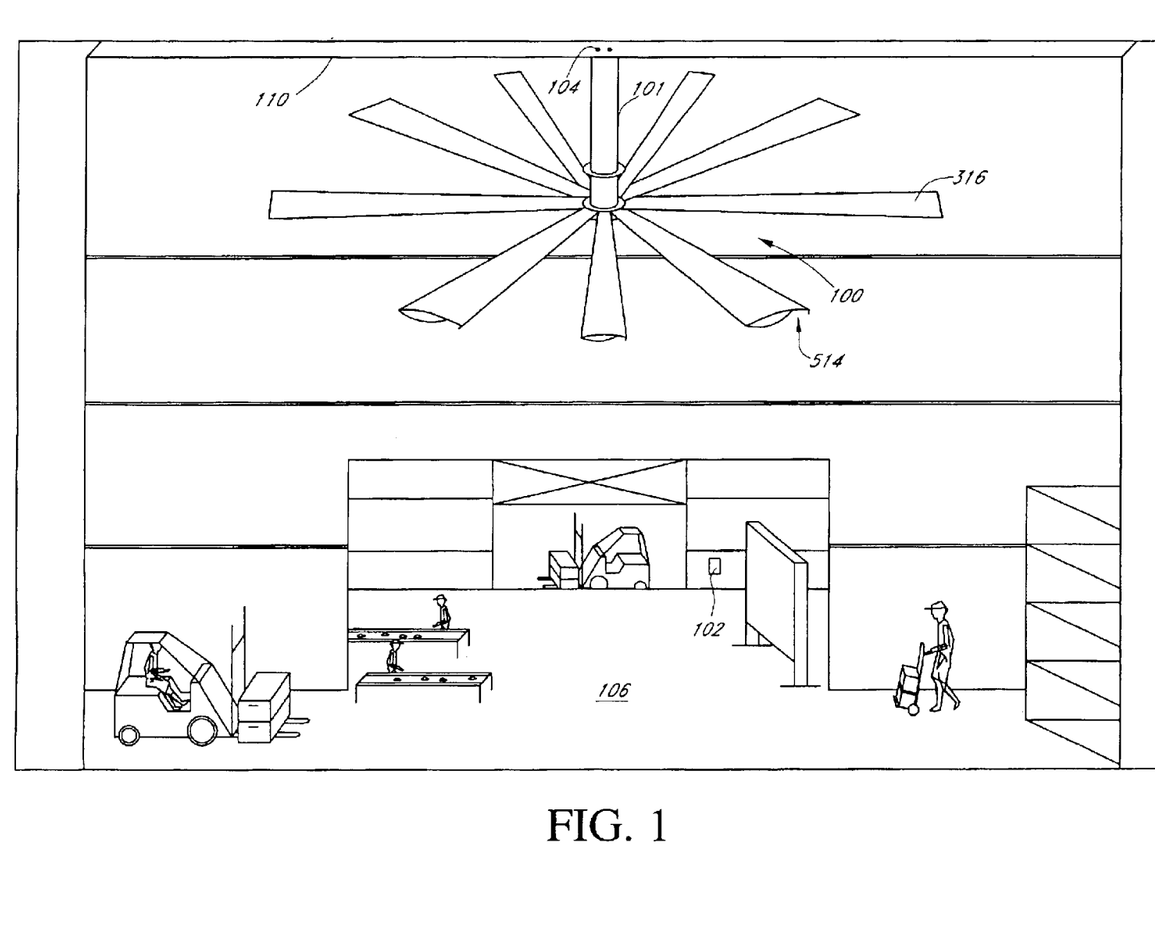
FIG. 1 illustrates one embodiment of a fan assembly having a plurality of fan blades with each having a reinforced trailing edge that may be positioned adjacent to the ceiling of a large commercial building.

Reference will now be made to the drawings wherein like numerals refer to like parts throughout. FIG. 1 illustrates one embodiment of a fan assembly 100 having a plurality of fan blades 316 with each having a reinforced trailing edge 514 that may be positioned adjacent to the ceiling 110 of a large commercial and/or industrial building 106. In a manner as will be described in greater detail herein below, an extrusion process may be used to form each fan blade 316 with the reinforced trailing edge 514. In one aspect, the occurrence of trailing edge tearing to the fan blade 316 during extrusion may be reduced due to the supporting features of the reinforced trailing edge 514 in a manner that will be described in greater detail herein below.

The fan assembly 100 may be attached to any suitable pre-existing supporting structure or to any suitable extension connected thereto in an overhead configuration such that the axis of rotation of the fan assembly 100 is along a substantially vertical direction. It should be appreciated that the structural components of the fan assembly 100 including the scope and functionality of the reinforced trailing edge 114 will be described in greater detail herein below with reference to FIGS. 3–6.

In one aspect, the fan assembly 100 may comprise a low speed fan assembly as described in the Applicant's issued U.S. Pat. No. 6,244,821, which is hereby incorporated by reference in its entirety. FIG. 1 further illustrates the fan assembly 100 attached to an extension piece 101, which may be attached to a mounting location 104 positioned on the ceiling 110 using conventional fasteners, such as nuts, bolts, and/or welds, as is known in the art. A control box 102 may be connected to the fan assembly 100 through a standard power transmission line so as to supply electrical power to the fan assembly 100 in a manner that will be described in greater detail herein below.

As further illustrated in FIG. 1, each fan blade 316 may take the form of a long narrow piece of aluminum with a hollow interior. In this particular embodiment, the fan blades 316 may be fabricated using a forced aluminum extrusion method of production in a manner as described in greater detail herein below with reference to FIGS. 7A, 7B. Advantageously, this allows lightweight fan blades 316 with considerable structural integrity to be produced in an inexpensive manner. It also enables the fan blades 316 to be inexpensively fabricated with aerodynamic features, such as flanged trailing edges and airfoil contoured shapes. In addition, each fan blade 316 may be fabricated with a uniform cross-section along its length. However, it should be appreciated that alternative embodiments may incorporate extruded aluminum fan blades with a non-uniform cross-section without departing from the scope of the present invention.

Moreover, the aerodynamic qualities of the fan blade 316 may be improved by forming a tapered trailing edge 514 on the fan blade 316, which may result in a more uniform airflow from the fan assembly 100 as is discussed in greater detail with reference to FIGS. 5, 6. Also, using standard fasteners, a cap may be mounted on the distal ends of the fan blade 316 so as to cover the end openings and provide a continuous exterior surface. In one embodiment, the cap may comprise a minimal structure that essentially matches the cross-sectional area of the fan blade 316.

Figure 2:
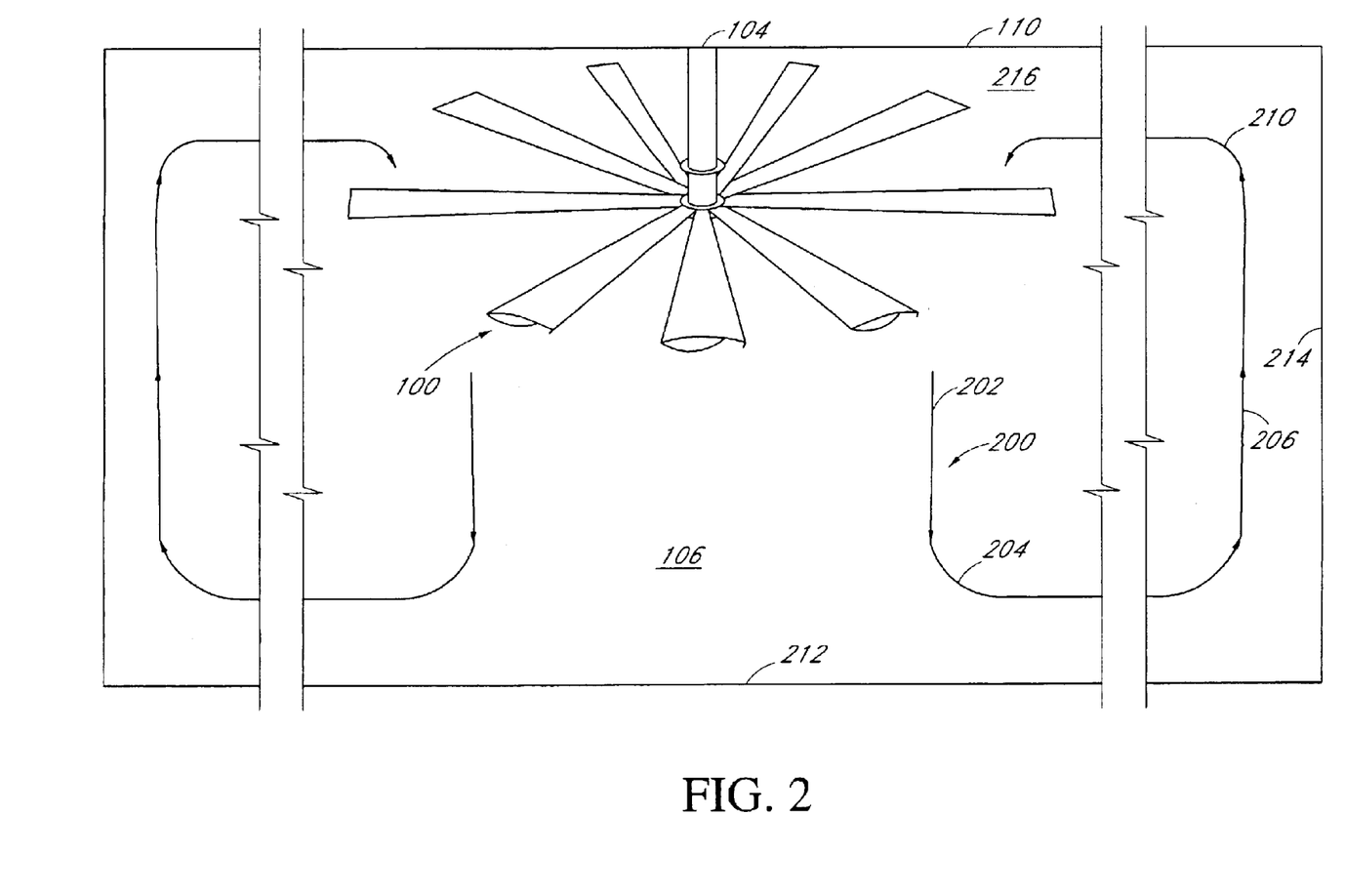
FIG. 2 illustrates one embodiment of the airflow pattern generated by the fan assembly of FIG. 1.

FIG. 2 illustrates one embodiment of the airflow pattern 200 generated by the fan assembly 100 of FIG. 1. As illustrated in FIG. 2, when a user places the fan assembly 100 into an operational mode by entering an appropriate input into the control box 102, a circulatory airflow 200 comprising, in one embodiment, gentle and/or uniform airflow patterns may be generated throughout the building's interior 106. In one embodiment, the circulatory airflow 200 comprises a large slowly moving downward airflow 202 that is able to travel through vast open spaces due to its large amount of inertial mass and because it travels away from the fan assembly 100 in a manner as described in the Applicant's issued U.S. Pat. No. 6,244,821.

In one aspect, the airflow 202 initially flows downward in a columnar manner towards a floor area 212 located beneath the fan assembly 100. As the airflow 202 approaches the floor area 212, the airflow 202 is subsequently diverted by the floor area 212 to outwardly expand in a radial manner as a lower horizontal airflow 204. Following, the lower horizontal air flow 204 is directed by the walls 214 of the warehouse into an upward airflow 206, which is further directed by the warehouse ceiling 110 into an upper inwardly moving horizontal airflow 210. Upon reaching a region 216 above the fan assembly 100, the returning air in airflow 210 is directed downward again by the action of the fan assembly 100, thus repeating the cycle. Advantageously, the circulating airflow 200 created by the fan assembly 100 provides a pleasant working environment for individuals working inside the warehouse interior 106.

Figure 3:
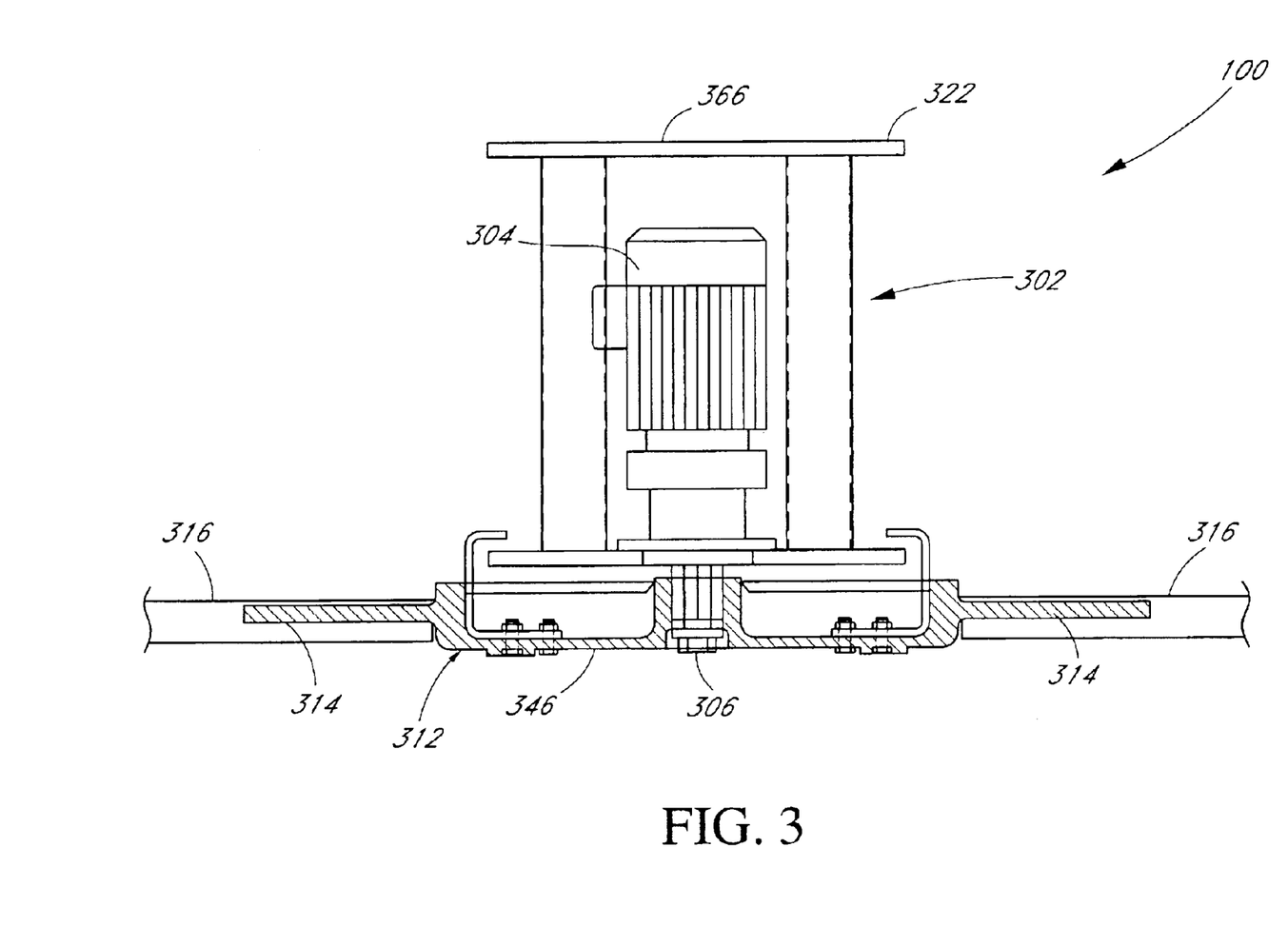
FIG. 3 illustrates a side elevation view of the fan assembly of FIG. 1.

FIG. 3 illustrates a detailed side elevation view of the fan assembly 100 in FIGS. 1, 2. The fan assembly 100 receives mechanical support from a support frame 302. The support frame 302 includes an upper steel horizontal plate 322 that is adapted to attach to a suitable horizontal support structure adjacent to a ceiling such that contact is made between the support structure and a first surface 366 of plate 322 to thereby allow the fan assembly 100 to be mounted adjacent the ceiling. In one embodiment, the plate 322 is bolted to a ceiling support girder so that the fan assembly 100 extends downward from the ceiling of the building in the manner similar to that shown in FIG. 1.

The fan assembly may further comprise an electric motor 304. The electric motor 304 may be adapted to receive an AC power source with a varying frequency which allows the electric motor 304 to produce a variable rotational speed. In one embodiment, the electric motor 304 may comprise an inverter duty electric motor manufactured by Baldor Motor of America. Also, the electric motor 304 may comprise a built-in gear reduction drive or mechanism manufactured by Lenze of Germany that provides the necessary mechanical advantage to drive the large fan assembly 100. It should be appreciated that the maximum rate of power consumption of the electric motor 304 is approximately 370 watts.

The electric motor 304 may be mounted to the support frame 302 in a manner such that the axis of rotation of the motor 304 is along a vertical direction thus providing the fan assembly 100 with a driving torque. The motor shaft 306 transfers torque from the electric motor 304 to a hub 312 that is mounted on the shaft 306. The hub 312 may comprise a single cast aluminum piece of material with a disk-like shape that is adapted to secure a plurality of fan blades 316. A plurality of blade supports 314 extend from a rim section 346 so as to extend radially outward from the axis of rotation defined by the motor shaft 306 by an approximate distance of 15 inches. The support blades 314 have a paddle-like shape and are adapted to slip into the ends of a plurality of fan blades 316 to provide a means for mounting the fan blades 316 to the hub 312. A more thorough discussion of the mechanical features of the fan assembly 100 including the mounting procedure of the fan blades 316 is described in the Applicant's issued U.S. Pat. No. 6,244,821.

Figure 4:
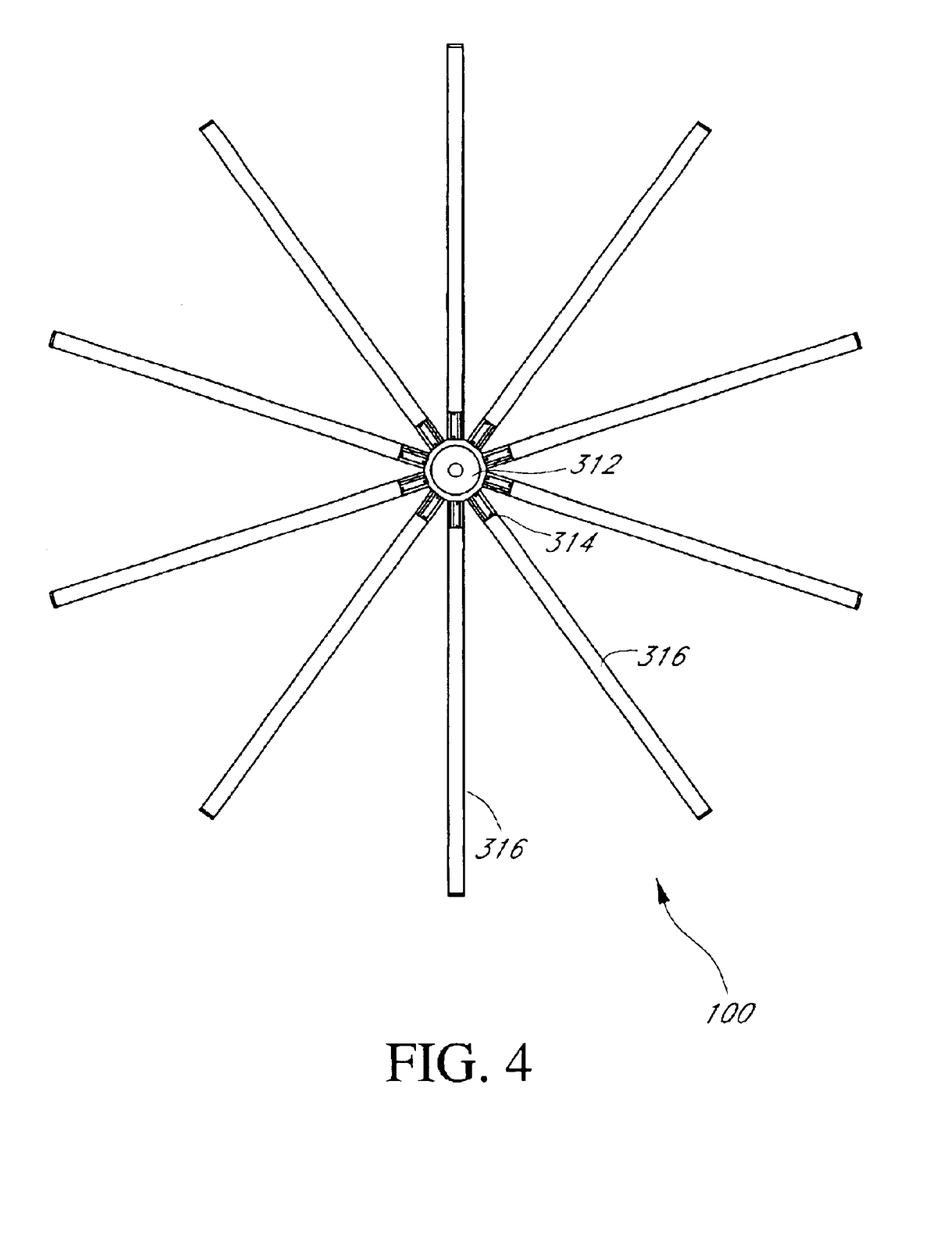
FIG. 4 illustrates an axial view as seen by an observer looking up towards the fan assembly of FIG. 1.

FIG. 4 is a view of the fan assembly 100 as seen from below and illustrates the relationship between the hub 312, the set of blade supports 314 extending from the hub 312, and the set of fan blades 316 extending from the blade supports 314. Each fan blade 316 extends orthogonally from the rotational axis of the fan assembly 100 as defined by the motor shaft 306 in a manner that results in a uniform distribution of the plurality of fan blades 316. In the one embodiment, the diameter of the fan assembly 100 may be fabricated with a diameter ranging from 8 feet up to 40 feet. This results in the aspect ratio of each fan blade 316 to range between 8:1 up to 40:1. When the fan assembly 100 is operating under normal conditions, the maximum blade tip velocity may range from approximately 25 feet per second up to approximately 75 feet per second depending on the diameter of the fan assembly 100. In addition, the fan blades 316 may be mounted to the hub 312 at an angle so as to improve performance and efficiency by increasing the volume of columnar air flow distributed by the fan assembly 100 during operation.

Figure 5:
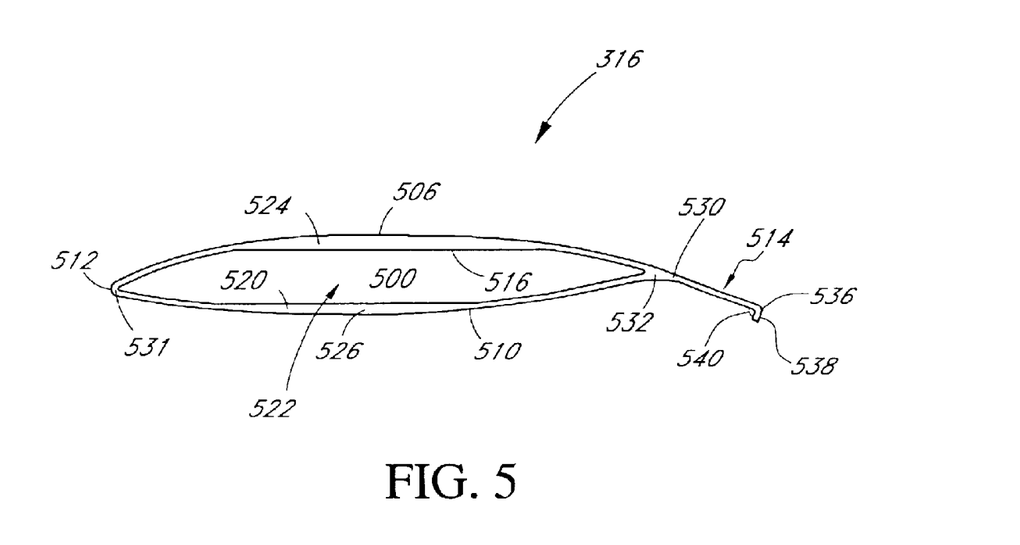
FIG. 5 illustrates a cross-sectional view of an individual fan blade in FIG. 1, wherein the fan blade comprises a reinforced trailing edge.

FIG. 5 illustrates a cross-sectional view of the fan blade 316 at an arbitrary location along its length as seen by an observer looking towards the distal end of the fan blade 316 with reference to FIG. 1. The fan blade 316 may comprise a first curved wall 524, a second curved wall 526, and a hollow interior region 522 formed therefrom. The two walls 524 and 526 may be joined together at leading junction 531 and a trailing junction 532. At the trailing junction 532, the two walls 524, 526 combine in a continuous manner to form a third wall 530, wherein the third wall 530 continues until it reaches the reinforced trailing edge 514, which may be tapered so as to decrease in thickness across its length. Additionally, a first surface 506 may be formed at the exterior of wall 524 and continues in a seamless manner to the exterior of wall 530 until the reinforced trailing edge 514 may be reached. A second surface 510 may be formed at the exterior of the wall 526 and continues in a seamless manner to the exterior of wall 530 until the reinforced trailing edge 514 may be reached.

Figure 5A:
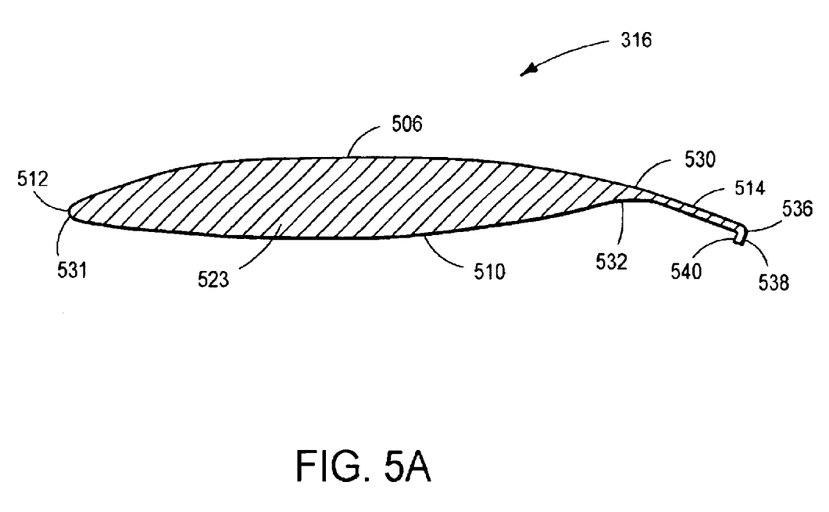
FIG. 5A illustrates a cross sectional view of a solid interior region fan blade in FIG. 1, wherein the fan blade comprises a reinforced trailing edge.

In addition, the two surfaces 506, 510 meet at a leading edge 512. The hollow interior region 522, which may also be referred to as a cavity region, may comprise a rectangularly-shaped central section 500. A planar third surface 516 may be formed at the interior wall 524 in the region of section 500, and a planar fourth surface 520 may be formed at the interior of wall 530 in the region of section 500. In one aspect, the planar interior surfaces 516, 520 may be substantially parallel to each other. It should be appreciated that the fan blade 316 may comprise a solid interior region 523 without departing from the scope of the present invention as is seen in FIG. 5A. It should also be appreciated that the cross-sectional dimensions of the fan blade 316 including the reinforced trailing edge 514 will be described in greater detail herein below with reference to FIG. 7B.

Moreover, the reinforced trailing edge 514 may comprise a downwardly extending flange 538 supported by a bent region 536. As illustrated in FIG. 5, the reinforced trailing edge 514 extends from the trailing junction 532 in a manner so as to follow the curvature of the first curved wall 524. The distal end of reinforced trailing edge 514 bends downward in a manner so as to form the bent region 536 and the downwardly extending flange 538. The flange 538 distally extends from the reinforced trailing edge 514 via the bent region 536 and forms a first angle 540 with the reinforced trailing edge 514. Depending on the particular application and operation of the fan blade 316, the length of the flange 538 and the angular displacement of the first angle 540 may vary in magnitude without departing from the scope of the present invention.

The length of the flange 538 may comprise a magnitude between 0.125 (⅛) and 0.375 (⅜) inches, and the angular displacement of the first angle may comprise a magnitude between 80 and 100 degrees. In a preferred embodiment, the flange 538 may comprise a length of approximately 0.25 (¼) inches, and the first angle 540 may comprise an angular displacement of approximately 90 degrees. In addition, the fan blade 316 including the reinforced trailing edge may comprise extruded aluminum, but it should be appreciated that the fan blade 316 may comprise various generally known extruded materials without departing from the scope of the present invention.

In one aspect, the structural bend of the bent region 536 increases the strength of the distal end of the reinforced trailing edge 514 in a manner such that the structural bend improves rigidity by providing supporting forces in two dimensions relatively parallel and perpendicular to its length. The Applicant has observed that, during extrusion of the fan blade 316, the trailing edge without the bent region 536 or the flange 538 may warp, tear, or deform in a manner so as to adversely affect the structural integrity of the trailing edge. For example, tearing of the unsupported trailing edge may occur during extrusion as a result of material being forced through an extrusion die such that pressure forces tend to tear unsupported regions. During formation, as the extruded material leaves the extrusion die, a pressure differential is created at the trailing junction 532 where the larger bulk material of the two exterior surfaces 506, 510 creates a large drifting pressure towards to the smaller bulk material of the trailing edge. Since the two exterior surfaces 506, 510 support each other at the trailing junction 532, the unsupported trailing edge is more susceptible to tearing as the length of the trailing edge 514 is made longer. Unfortunately, a shorter trailing edge reduces the aerodynamic performance of the fan blade 316.

Conversely, the benefit of forming the fan blade 316 with a reinforced trailing edge 514 of the present invention results in improved structural characteristics such that the reinforced trailing edge 514 may be fabricated longer so as to improve the aerodynamic performance of the fan blade 316. In one aspect, the reinforced trailing edge 514 resists damage and/or tearing that may occur during extrusion by adding the bent flanged region 536, 538 to the distal end of the trailing edge 514. For example, the bent portion 536 of the reinforced trailing edge 514 tends to rigidly orient the extruded material in a stabilized position more readily during formation. Moreover, the bent portion 238 provides added strength by providing supporting forces in two dimensions that relatively parallel and perpendicular to its length so as to neutralize the adverse effects of pressure forces acting on the trailing edge of the fan blade 316. Additional benefits associated with the downwardly extending flange 514 will be described in greater detail below.

As illustrated in FIG. 5, the two exterior surfaces 506, 510 may be adapted to form the contour of an airfoil shape. For example, the airfoil shape may be based on the shape of a German sail plane wing having a reference number FX 62-K-131. In one aspect, the fan blade 316 may comprise a length between approximately 3 feet and 15 feet long and may be formed of an extruded metal so as to have a first air foil section 502 and a tapered trailing edge 514, wherein the flange 538 may be integrally formed at the end of the tapered trailing edge 514 so as to reinforce the tapered trailing edge 514 and so as to provide increased downward thrust during rotation of the fan blades 316. When the fan assembly 100 is in an operating mode, the cross-sectional image of the fan blade 316, as illustrated in FIGS. 1, 2, tilted by a corresponding angle of attack in a clockwise manner would appear to travel with the leading edge 512 in front.

According to an observer fixed to an individual fan blade 316, the motion of the fan blade 316 may cause air currents 600, 602 along the surfaces 506, 510 of the fan blade 316, respectively. The airfoil shape of each fan blade 316 may further cause the velocity of the upper air current 534 to be greater than the velocity of the lower air current 536. As a result, the air pressure at the lower surface 510 may be greater than the air pressure at the upper surface 506. The apparent asymmetric airflows produced by the rotation of the fan blades 316 results an upward lift force $F_{lift}$ to be experience by each fan blade 316. A reactive downward force $F_{vertical}$ is therefore applied to the surrounding air by each fan blade 316. Moreover, the airfoil shape of the fan blade 316 may reduce a horizontal drag force $F_{drag}$ acting on each fan blade 316, therefore resulting in a reduced horizontal force $F_{horizontal}$ being applied to the surrounding air by each fan blade 316. Therefore, the airflow created by the fan assembly 100 may approximate a columnar flow of air along the axis of rotation of the fan assembly 100.

Figure 6:
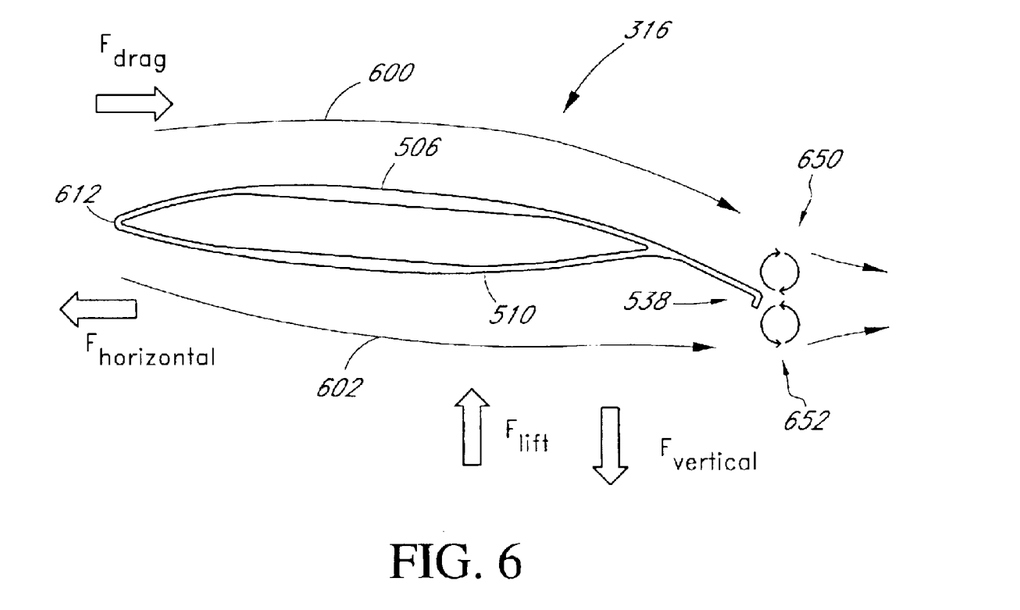
FIG. 6 illustrates the cross-sectional view of the individual fan blade of FIG. 5 including the aerodynamic forces generated by the fan assembly of FIG. 1.

As further illustrated in FIG. 6, the downwardly extending flange 538 enhances the performance of the fan blade 316. During rotation of the fan blade 316, the flange 538 may produce two counter rotating vortices 650, 652 adjacently downstream of the reinforced trailing edge 514. An upper vortex 650 may be produced by the upper stream of airflow 600 flowing above the fan blade 316, and a lower vortex 652 may be produced by the lower stream of airflow 602 flowing underneath the fan blade 316. In one aspect, the upper vortex 650 generates a pseudo pumping action that maintains a lower pressure above the fan blade 316, thus effectively producing additional downward force $F_{vertical}$. Moreover, the counter rotating vortices 650, 652 virtually extend the length of the trailing edge 514 in a manner such that the fan blade 316 produces additional downward force $F_{vertical}$. Even though the horizontal drag force $F_{drag}$ is slightly increased, the advantages of increasing the downward force $F_{vertical}$ are substantial.

Advantageously, the technical difficulties involved in designing the fan assembly 100 have been overcome by incorporating innovative design features. In particular, the large fan blades 316 may be manufactured using an extruded aluminum technique. This method results in fan blades 316 that are sturdy, lightweight, and relatively inexpensive to manufacture. The extrusion method may also enable the fan blades 316 to be fabricated with an airfoil shape, which enables a columnar airflow to be generated.

Figure 7A:
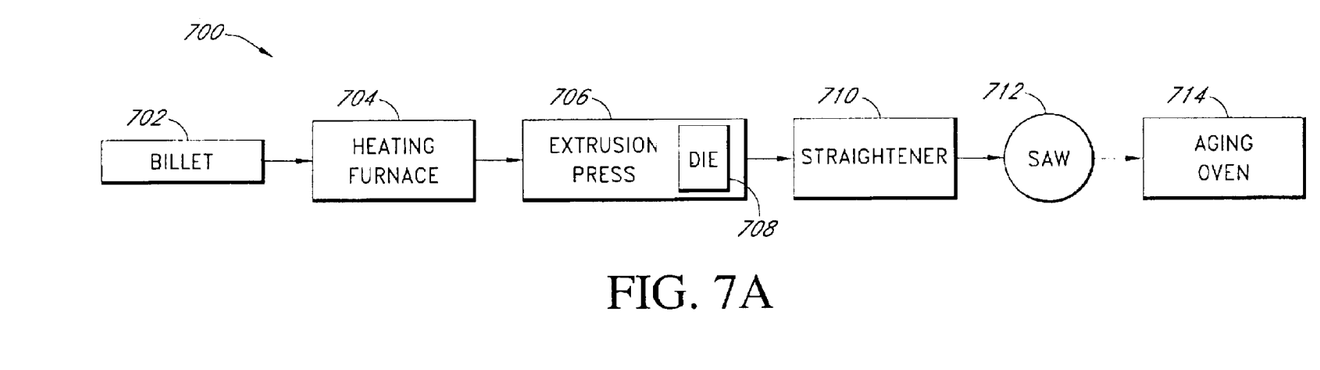
FIG. 7A illustrates one embodiment of a plurality of extrusion based manufacturing components including an extrusion die that may be used to form the extruded fan blade having the reinforced trailing edge.

FIG. 7A illustrates one embodiment of a plurality of extrusion manufacturing components 700 including an extrusion die 708 that may be used to form an extruded fan blade 316 having a reinforced trailing edge 514. The material used for the extrusion process may comprise an extrusion billet 702, wherein the extrusion billet 702 may be a solid or hollow piece of material that may be cylindrical in shape. In one aspect, the extrusion billet 702 may comprise alloyed aluminum in a generally known form, such as a cast product, wrought product, or powder compact product that may be cut from a longer length of material. It should be appreciated that alloyed materials may comprise one or more metallic elements without departing from the scope of the present invention. For example, aluminum based extrusion alloys may comprise small amounts of metallic elements such as copper, manganese, silicon, magnesium, or zinc. Advantageously, these alloying elements enhance the natural properties of aluminum and influence the extrusion process.

The extrusion billet 702 may vary in length depending on a number of predetermined parameters including the desired length of the finished profile, the extrusion ratio, the length of the run-out, and the requirements of the extrusion press. In one aspect, the length of the extrusion billet 702 may range from approximately 36 inches to about 40 inches. In addition, the outside diameter of the extrusion billet 702 may range from approximately 7 inches to about 8 inches. It should be appreciated that the outside diameter of the extrusion billet 702 may be as large as 14 inches without departing from the scope of the present invention.

The next extrusion manufacturing component may comprise a heating furnace 704 that may be used to preheat the extrusion billet 702. During the extrusion process, the billet 702 is softened and/or softened in the heating furnace 704 so as to be more pliable. The softening point of aluminum varies with the purity of the metal, but is approximately 1,220° Fahrenheit (660° Centigrade). In one embodiment, the extrusion process may require the billet 702 to be heated to temperatures in excess of 700° F. (375° C.) and, depending upon the alloy being extruded, as high as 930° F. (500° C.).

Figure 7B:
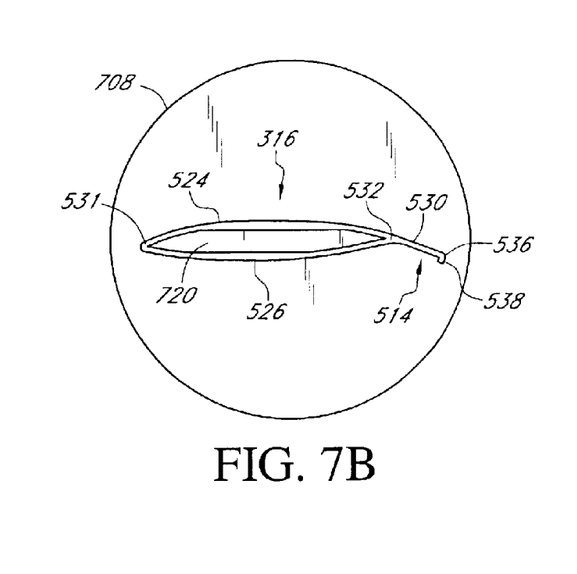
FIG. 7B illustrates one embodiment of an extrusion die that comprises an opening with a pattern similar in shape to the cross-sectional profile of the fan blade having the reinforced trailing edge.

The following manufacturing component may comprise an extrusion press 706 having an extrusion die 708. FIG. 7B illustrates one embodiment of an extrusion die 708 that comprises a pattern similar in shape to the fan blade 316 having the reinforced trailing edge 514. The extrusion die 708 may comprise a steel disk with an opening that may be sized and shaped to substantially match the intended cross-section of the final extruded profile of the fan blade 316. The opening or orifice runs completely through the extrusion die 708 so as to allow the softened billet 702 passage through from the front end to the back end. As is known in the art, dies may be grouped as solid (or flat) dies, which produce solid shapes, and hollow dies, which produce hollow or semi-hollow shapes, such as the fan blade 316 as illustrated in FIGS. 5, 6.

Combinations of solid, semi-hollow, and/or hollow shapes may be incorporated into a single die, wherein a solid die may have one or more orifices or apertures through which the softened alloy is forced (extruded). As illustrated in FIG. 7B, the extrusion die 708 die may be used to produce hollow profiles by means of a fixed or floating mandrel 720. Advantageously, the use of the extrusion die 708 with the mandrel 720 for extruding the fan blade 316 produces a hollow shape. Without departing from the scope of the present invention, it should be appreciated by one skilled in the art that the extrusion die 708 may be formed without the mandrel 720 so as to produce an extruded fan blade 316 with a solid interior region.

As is known in the art, the extrusion press may further comprise an extrusion press container that houses the billet 702 and a ram that may be used to apply pressure and/or force to the billet 702 within the container. Various hydraulic extrusion presses may be capable of exerting anywhere from 100 tons to 15,000 tons of pressure, wherein the pressure capacity of the extrusion press determines how large an extrusion it may produce. When pressure is applied, the billet 702 is forced against the die 708 and expands until restricted by contact with the walls of the container. Then, as the pressure increases, the soft (but still solid) metal forced to squeeze out through the shaped orifice of the extrusion die 708 in a manner so as to emerge on the other side of the extrusion die 708 as a formed profile of the fan blade 316. Subsequently, the extruded fan blade 316 may be removed from the back end of the extrusion die 708. After the extruded fan blade 316 is removed from the extrusion die 708, the still-hot extruded fan blade 316 may be quenched, mechanically treated, and aged.

In one embodiment, the cross-sectional dimensions and/or profile of the extruded fan blade 316 may comprise a width between approximately 5 inches and 8 inches and a height between approximately 0.75 (¾) inches and 1.50 (3/2) inches. In a preferred embodiment, the cross-sectional dimensions of the fan blade 316 may comprise a width of approximately 7 inches and a height of approximately 1 inch. Also, the thickness of the first, second, and third curved walls 524, 526, 530 may be between approximately 0.0625 (1/16) inches and 0.1875 (3/16) inches thick. In a preferred embodiment, the thickness of the walls 524, 526, 530 may be approximately 0.15625 (5/32) inches thick. Alternatively, the third wall 530 may comprise a tapered shape so as to decrease in thickness from approximately 0.1875 (3/16) inches at the trailing junction 532 across its length to approximately 0.0625 (1/16) inches at the reinforced trailing edge 514.

Additionally, depending on the size of the billet 702 and the size of the die 708 opening, a continuous extrusion as much as 100 feet long may be produced with each stroke of the extrusion press 706. The newly-formed extruded fan blade 316 may be supported on a run-out conveyor as the extruded fan blade 316 leaves the extrusion press 706. The extrusion may then be transferred to a cooling table and cooled after emerging from the die 708 through the use of air or water quenches.

The next manufacturing component may comprise a straightener 710 and a saw 712, wherein the straightener 710 may be used, after the extruded profile has been cooled to straighten the profile and correct any twisting that may have occurred subsequent to the extrusion process. After straightening, conveyors may be used to feed the extruded fan blade 316 to the saw 712. The saw 712 may comprise a finish cut saw that may be used to cut the extruded profile to a desirable length. In one embodiment, the finish cut dimensions of the extruded fan blade 316 may comprise a length between approximately 4 feet and 15 feet. In a preferred embodiment, the finish cut dimensions of the fan blade 316 may comprise a length of approximately 112 inches. Also, circular saws and/or a radial arm saw may be used to cut across the profile at an angle that is substantially perpendicular to the length of the extruded profile. In various other embodiments, the saw 712 may comprise a power miter saw, that drops down onto the profile, or a table saw with a circular blade that rises to cut the extruded profile. A typical finish cut saw may be 16 to 20 inches in diameter with carbide-tipped teeth.

The following manufacturing component may comprise an aging oven 714. As is known in the art, some extrusion alloys reach their optimal strength through the process of aging, which may be referred to as age-hardening. Natural aging may occur at room temperature, and artificial aging may comprise controlled heating in the aging oven 714, which may be referred to as precipitation heat-treating. In one aspect, when the extruded profile emerges from the extrusion press 706, the extruded profile may comprise a semi-solid state, but rapidly solidifies as it cools or is quenched. It should be appreciated that aluminum alloys, such as those comprising manganese or magnesium, derive their strength through natural aging and cold working. Alternatively, other aluminum alloys, such as those comprising copper, zinc, and magnesium with silicon, may be further strengthened or hardened through controlled thermal treatments that affect the metallurgical structure of the alloys. Consequently, the aging process may ensure substantially uniform precipitation of fine particles through the metal, yielding increased strength, hardness, and elasticity for the specific extrusion alloy.

The extrusion process, as described with reference to FIG. 7A, may be utilized to shape the fan blade 316 having a continuous cross-section by forcing the extrusion billet 702 through the extrusion die 708, which comprises a profile opening of the fan blade's 316 cross-section as illustrated in FIG. 7B. The process of forming the extruded fan blade 316 having the reinforced trailing edge 514 may proceed as follows. The extrusion die 708 may be prepared and attached to the extrusion press 706. Next, the extrusion billet 702, which preferably comprises an aluminum alloy, may be placed in an extrusion press container and preheated in the heating furnace 704. The pliable billet 702 may be forced through the extrusion die 708 by applying pressure to the billet 702 using the extrusion press 706 in a manner so as to form the fan blade 316 with the reinforced trailing edge 514. Once the extruded profile of the fan blade 316 is cooled and straightened in the straightener, the extruded profile may be cut using the saw 712 at predetermined intervals so as to form a plurality of fan blades 316 with the desired length of the fan blade 316 from the extruded profile. Additional processing may comprise aging the extruded fan blades 316 in a manner as previously described. After processing the extruded fan blades 316, the process of forming the fan blades 316 is completed.

Advantageously, the technical difficulties involved when extruding the fan blade 316 have been overcome by reinforcing the trailing edge 514 with the bent region 536 and the downwardly extending flange 538. Since the large fan blades 316 are formed using an extruded aluminum technique, the formation process results in improved fan blades 316 that comprise enhanced structural characteristics, such as improved rigidity, sturdiness, and resiliency. The extrusion method may also enable the fan blades 316 to be fabricated with enhanced aerodynamic performance characteristics, which enables a larger columnar airflow to be generated during operation. Therefore, the improved design of the above-mentioned fan assembly 100 with improved fan blades 316 having the reinforced trailing edge 514, as described herein, comprises a significant improvement over the prior art.

Although the preferred embodiment of the present invention has shown, described, and pointed out the fundamental novel features of the invention as applied to this particular embodiment, it will be understood that various omissions, substitutions and changes in the form of the detail of the device illustrated may be made by those skilled in the art without departing from the spirit of the present invention. Consequently, the scope of the invention should not be limited to the foregoing description, but should be defined by the appending claims.

What is claimed is:

1. A fan assembly for circulating air in an industrial building, the fan assembly comprising:
    a support adapted to allow the mounting of the fan assembly to the roof of the industrial building;
    a motor coupled to the support, the motor engaged with a rotatable shaft so as to induce rotation of the shaft; and
    a plurality of airfoil shaped fan blades attached to the rotatable shaft, wherein each fan blade is formed of an extruded metal such that a first curved wall is joined to a second curved wall to form a leading junction and a trailing junction, and wherein the trailing junction extends to form a third curved wall having a tapered trailing edge, each blade further comprising a bent flange that distally extends from the trailing edge in a continuous manner that reinforces the trailing edge.

2. The fan assembly of claim 1, wherein the flange downwardly extend from the lower surface of the third curved wall.

3. The fan assembly of claim 1, wherein the first curved wall is joined to a second curved wall to form a hollow interior region.

4. The fan assembly of claim 1, wherein the first curved wall is joined to a second curved wall to form a solid interior region.

5. The fan assembly of claim 1, wherein each fan blade comprises a cross-sectional width between approximately 5 inches and 8 inches.

6. The fan assembly of claim 1, wherein each fan blade comprises of cross-sectional height between approximately 0.75 (¾) inches and 1.50 (3/2) inches.

7. The fan assembly of claim 1, wherein each fan blade comprises a length between approximately 4 feet and 14 feet.

8. The fan assembly of claim 1, wherein the first and second curved walls comprise a thickness between approximately 0.0625 (1/16) inches and 0.1875 (3/16) inches.

9. A fan assembly for circulating air in an industrial building, the fan assembly comprising:
    a support adapted to allow the mounting of the fan assembly to the roof of the industrial building;
    a motor coupled to the support, the motor engaged with a rotatable shaft so as to induce rotation of the shaft; and
    a plurality of fan blades attached to the rotatable shaft, wherein each fan blade is formed of an extruded metal such that a first curved wall is joined to a second curved wall to form a leading junction and a trailing junction, and wherein the trailing junction extends to form a third curved wall having a tapered shape that decreases in thickness across its length from approximately 0.1875 (3/16) inches at the trailing junction to approximately 0.0625 (1/16) inches at a trailing edge, each blade further comprising a flange that distally extends from the trailing edge in a continuous manner such that the angular displacement of the flange from the trailing edge forms a bent region that reinforces the trailing edge.

10. The fan assembly of claim 9, wherein the flange comprises a length between approximately 0.125 (1/8) and 0.375 (3/8) inches.

11. The fan assembly of claim 9, wherein the plurality of fan blades are attached to a hub, which is connected to the rotatable shaft.

12. The fan assembly of claim 9, wherein the plurality of fan blades includes at least ten fan blades.

13. The fan assembly of claim 9, wherein each of the plurality of fan blades are fabricated using an extrusion technique.

14. The fan assembly of claim 13, wherein the extruded metal comprises aluminum.

15. A metal blade for a fan assembly used in an industrial building, the fan blade comprising an extruded cross-sectional profile wherein the extruded cross-sectional profile comprises a cross-sectional width of approximately 7 inches, the cross sectional profile further having a plurality of curved walls, wherein a first curved wall is joined to a second curved wall to form an airfoil shape having a trailing edge that includes a flange extending outward from the direction of the trailing edge, wherein the flanged portion of the trailing edge downwardly extends from the lower surface of the trailing edge such that the angular displacement of the flanged portion from the lower surface of the trailing edge forms a reinforced region that increases the structural rigidity of the trailing edge so that the flanged trailing edge resists damage, and wherein the flange increases the volume of airflow resulting from the operation of the fan assembly having the fan blade.

16. A metal fan blade for a fan assembly used in an industrial building, the fan blade comprising an extruded cross-sectional profile wherein the cross sectional profile comprises a cross-sectional height of approximately 1 inch, the cross sectional profile further having a plurality of curved walls, wherein a first curved wall is joined to a second curved wall to form an airfoil shape having a trailing edge that includes a flange extending outward from the direction of the trailing edge, wherein the flanged portion of the trailing edge downwardly extends from the lower surface of the trailing edge such that the angular displacement of the flanged portion from the lower surface of the trailing edge forms a reinforced region that increases the structural rigidity of the trailing edge so that the flanged training edge resists damage, and wherein the flange increases the volume of airflow resulting from the operation of the fan assembly having the fan blade.

17. The fan blade of claim 16, wherein the fan blade comprises a length of at least 4 feet.

18. The fan blade of claim 16, wherein the fan blade comprises a length of at least less than 15 feet.

19. A metal fan blade for a fan assembly used in an industrial building, the fan blade comprising an extruded cross-sectional profile having a plurality of curved walls, wherein a first curved wall comprising a thickness of approximately 0.15625 (5/32) inches is joined to a second curved wall comprising a thickness of approximately 0.15625 (5/32) inches to form an airfoil shape having a trailing edge that includes a flange extending outward from the direction of the trailing edge, wherein the flanged portion of the trailing edge downwardly extends from the lower surface of the trailing edge such that the angular displacement of the flanged portion from the lower surface of the trailing edge forms a reinforced region that increases the structural rigidity of the trailing edge so that the flanged training edge resists damage, and wherein the flange increases the volume of airflow resulting from the operation of the fan assembly having the fan blade.

20. The fan blade of claim 19, wherein the trailing edge comprises a tapered shape that decreases in thickness across its length.

21. The fan blade of claim 19, wherein the flange comprises a length between approximately 0.125 (1/8) and 0.375 (3/8) inches.

22. The fan blade of claim 19, wherein the fan blade is fabricated using an extrusion die to form the extruded cross-sectional profile of the fan blade.

23. The fan blade of claim 22, wherein the fan blade is formed using an aluminum extrusion technique.

24. A fan assembly for cooling industrial buildings, the fan assembly comprising:
a mounting assembly having a rotatable hub that attaches the fan assembly to the ceiling of the industrial building; a plurality of fan blades mounted to the rotatable hub, wherein each of the plurality of fan blades is a least 4 feet long and is formed of an extruded metal so as to have a first air foil section and a tapered trailing edge, wherein the tapered trailing edge is bent at a distal end to integrally form a flange so as to reinforce the tapered trailing edge and so as to provide increased downward thrust during rotation of the fan blades and including a first curved wall joined to a second curved wall to form the first air foil section having a hollow interior region wherein the first curved wall is extended to form the tapered trailing edge.

25. The fan assembly of claim 24, wherein the plurality of fan blades are formed using an extrusion fabrication process.

26. The fan assembly of claim 25, wherein the flange reinforces the tapered trailing edge during the extrusion fabrication process so that the tapered trailing edge resists tearing while being formed.

27. The fan assembly of claim 24, wherein each of the plurality of fan blades comprises aluminum.

* * * * *